United States Patent
Yoshida et al.

(10) Patent No.: US 7,001,305 B2
(45) Date of Patent: *__Feb. 21, 2006__

(54) TOROIDAL TYPE CONTINUOUSLY VARIABLE TRANSMISSION

(75) Inventors: Masato Yoshida, Fujisawa (JP); Kouji Ishikawa, Fujisawa (JP); Takashi Imanishi, Yokohama (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/754,561

(22) Filed: Jan. 12, 2004

(65) Prior Publication Data

US 2004/0142789 A1    Jul. 22, 2004

Related U.S. Application Data

(62) Division of application No. 09/695,906, filed on Oct. 26, 2000, now Pat. No. 6,682,457.

(30) Foreign Application Priority Data

Nov. 1, 1999    (JP)    ................................. 11-310994

(51) Int. Cl.
*F16H 15/38*    (2006.01)

(52) U.S. Cl. ............................................. 476/8; 476/40
(58) Field of Classification Search .............. 476/7–10, 476/40, 42; 74/467; 184/6.1, 6.5, 6.9, 7.4
See application file for complete search history.

(56) References Cited

U.S. PATENT DOCUMENTS

| | | | |
|---|---|---|---|
| 2,959,972 A | 11/1960 | Madson | 476/7 |
| 2,962,909 A | 12/1960 | Jaquith et al. | 476/7 |
| 2,971,390 A | 2/1961 | Rygelis et al. | 476/7 |
| 4,576,055 A | 3/1986 | Kraus | 476/10 |
| 4,751,858 A | 6/1988 | Iwatsuki | 74/467 |
| 5,989,150 A | 11/1999 | Yamamoto | 476/10 |
| 6,030,311 A | 2/2000 | Osumi | 476/10 |
| 6,203,467 B1 | 3/2001 | Yamamoto et al. | 476/42 |

FOREIGN PATENT DOCUMENTS

| | | |
|---|---|---|
| JP | 52-18572 | 2/1977 |
| JP | 62-71465 | 5/1987 |
| JP | 62-283256 | 12/1987 |
| JP | 1-173552 | 12/1989 |
| JP | 2-47458 | 3/1990 |
| JP | 4-29659 | 1/1992 |
| JP | 6-11426 | 3/1994 |
| JP | 10-132045 | 5/1998 |
| JP | 11-63185 | 3/1999 |
| JP | 11-210855 | 8/1999 |

*Primary Examiner*—William C. Joyce
(74) *Attorney, Agent, or Firm*—Miles & Stockbridge, PC (57) ABSTRACT

In a toroidal continuously variable transmission the amount of traction oil provided to contact areas between the power rollers and the input and output discs is increased as a power to be transmitted is increased. Nozzle holes formed in rockable trunnions of the transmission so that the traction oil ejected from the nozzle holes is sprayed to circumferential positions of inner surfaces of input and output discs that are in contact with peripheral surfaces of power rollers. Transmission efficiency is enhanced while maintaining endurance and reliability without supplying excessive traction oil.

2 Claims, 11 Drawing Sheets

TOROIDAL TYPE CONTINUOUSLY VARIABLE TRANSMISSION

CROSS-REFERENCE TO RELATED APPLICATION

This application is a division of application Ser. No. 09/695,906 filed Oct. 26, 2000 now U.S. Pat. No. 6,682,457.

BACKGROUND OF THE INVENTION

1. Field of the Invention

The present invention relates to an improvement in a toroidal type continuously variable transmission used as a transmission for a motor vehicle, for example, in order to realize a structure which can transmit great power and has sufficient endurance by adequetely supplying oil to a power transmitting portion needed.

2. Related Background Art

Figure 8:
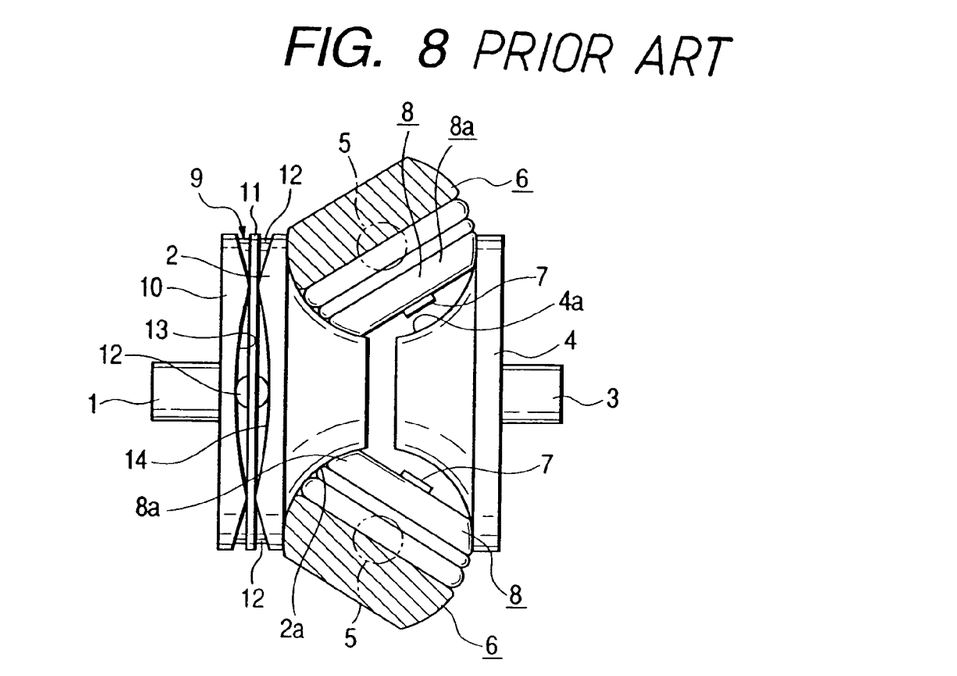
FIG. 8 is a side view showing a fundamental construction of a conventional toroidal type continuously variable transmission in a maximum speed reduction condition.
Figure 9:
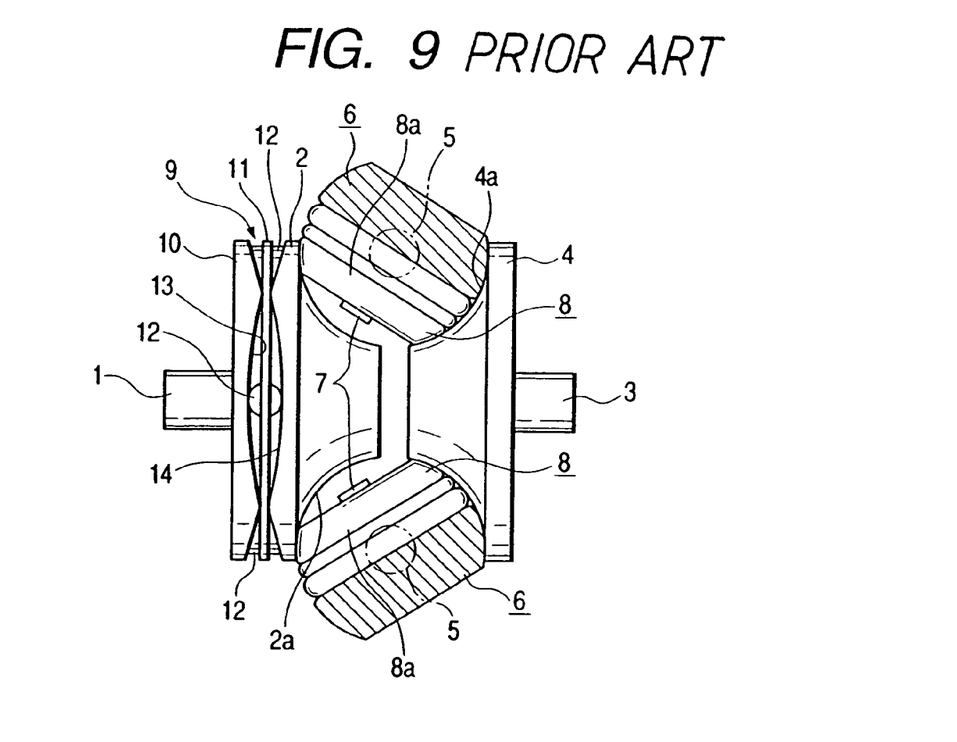
FIG. 9 is a side view of the toroidal type continuously variable transmission of FIG. 5 in a maximum speed increase condition.

Application of a toroidal type continuously variable transmission as schematically shown in FIGS. 8 and 9 to a transmission of a motor vehicle has been investigated. For example, as disclosed in Japanese Utility Model Application Laid-Open No. 62-71465, in the toroidal type continuously variable transmission, an input side disc 2 is coaxially supported with an input shaft 1, and an output side disc 4 is secured to an end of an output shaft 3 coaxially disposed with the input shaft 1. Within a casing containing the toroidal type continuously variable transmission, trunnions 6, which rock around pivot shafts 5 located at positions twisted with respect to the input shaft 1 and the output shaft 3, are disposed between the input side disc 2 and the output side disc 4 in an axial direction.

That is to say, the trunnions 6 are provided at their outer surfaces with the pivot shafts 5, which are coaxial with each other. Further, proximal ends of displacement shafts 7 are supported on intermediate portions of the trunnions 6 so that inclination angles of the displacement shafts 7 can be adjusted by rocking the trunnions 6 around the pivot shafts 5. Power rollers 8 are rotatably supported around the displacement shafts 7 supported by the trunnions 6. The power rollers 8 are pinched between opposed inner surfaces 2a and 4a of the input and output side discs 2 and 4. Each of the inner surfaces 2a, 4a has, in section, a concave surface obtained by rotating an arc around the pivot shaft 5. Peripheral surfaces 8a of the power rollers 8 having spherical convex surfaces are contacted with the inner surfaces 2a, 4a.

An urging device 9 of loading cam type is disposed between the input shaft 1 and the input side disc 2 so that the input side disc 2 can be elastically biased toward the output side disc 4 by the urging device 9. The urging device 9 comprises a cam plate 10 rotated together with the input shaft 1, and a plurality (for example, four) of rollers 12 rotatably held by a holder 11. A cam surface 13 made concave and convex alternately in a circumferential direction is formed on one side surface (right side surface in FIGS. 8 and 9) of the cam plate 10, and a cam surface 14 having a similar configuration is formed on an outer surface (left side surface in FIGS. 8 and 9) of the input side disc 2. The plurality of rollers 12 are supported for rotation around axes oriented radially with respect to the centerline of the input shaft 1.

In use of the toroidal type continuously variable transmission having the above-mentioned construction, when the cam plate 10 is rotated as the input shaft 1 is rotated, the cam surface 13 urges the plurality of rollers 12 against the cam surface 14 formed on the outer surface of the input side disc 2. As a result, the input side disc 2 is urged against the plurality of power rollers 8 and, at the same time, the input side disc 2 is rotated due to the urging between the cam surfaces 13, 14 and the plurality of rollers 12. The rotation of the input side disc 2 is transmitted to the output side disc 4 through the plurality of power rollers 8, thereby rotating the output shaft 3 secured to the output side disc 4.

In a case where a rotational speed ratio (transmission ratio) between the input shaft 1 and the output shaft 3 is changed, when deceleration (speed reduction) is effected between the input shaft 1 and the output shaft 3, the trunnions 6 are rocked in predetermined directions around the pivot shafts 5. And, the displacement shafts 7 are inclined so that, as shown in FIG. 8, the peripheral surfaces 8a of the power rollers 8 abut against a portion near the center of the inner surface 2a of the input side disc 2 and a portion near the peripheral of the inner surface 4a of the output side disc 4, respectively. On the other hand, when acceleration (speed increase) is effected, the trunnions 6 are rocked in opposite directions around the pivot shafts 5. And, the displacement shafts 7 are inclined so that, as shown in FIG. 9, the peripheral surfaces 8a of the power rollers 8 abut against a portion near the peripheral of the inner surface 2a of the input side disc 2 and a portion near the center of the inner surface 4a of the output side disc 4, respectively. When the inclination angles of the displacement shafts 7 are selected to an intermediate value between FIG. 8 and FIG. 9, an intermediate transmission ratio can be obtained between the input shaft 1 and the output shaft 3.

Figure 10:
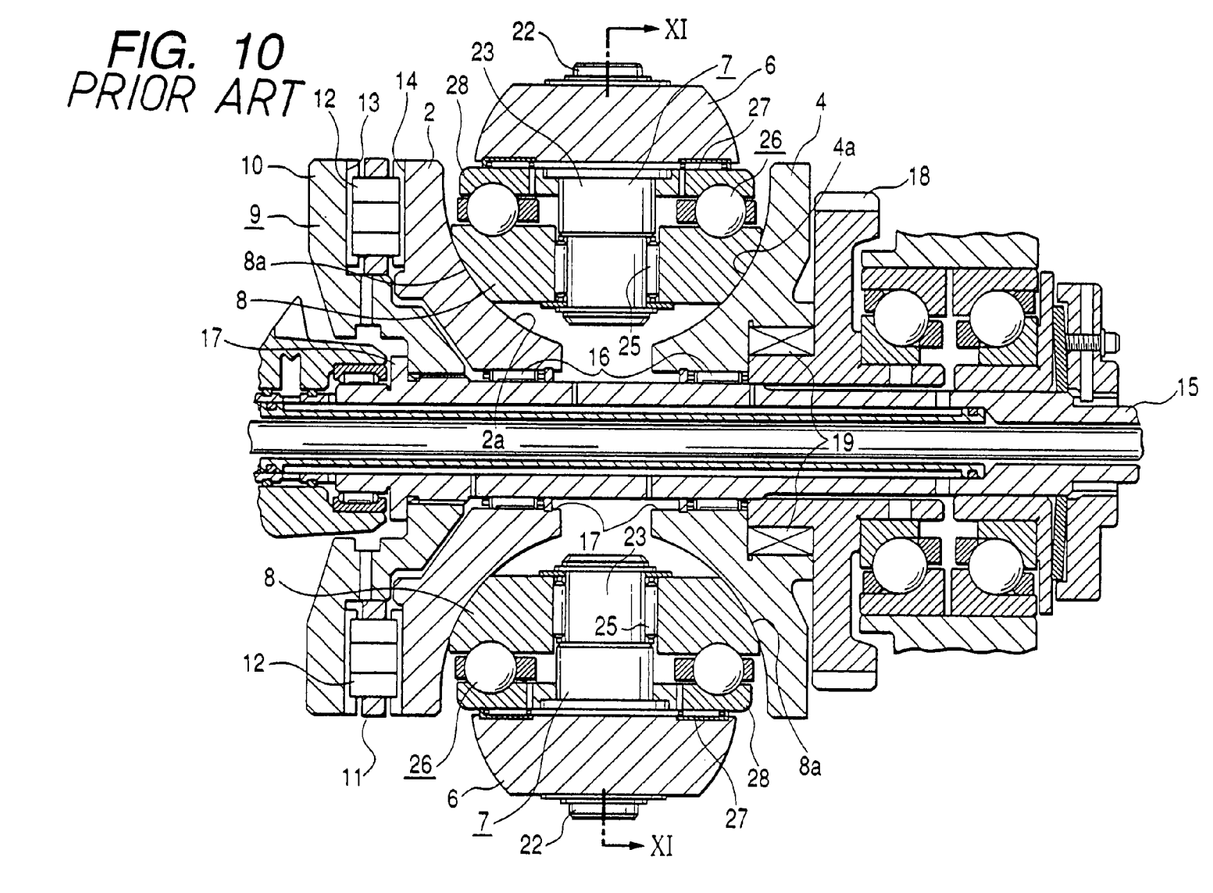
FIG. 10 is a sectional view showing a first example of a concrete construction of a toroidal type continuously variable transmission.
Figure 11:
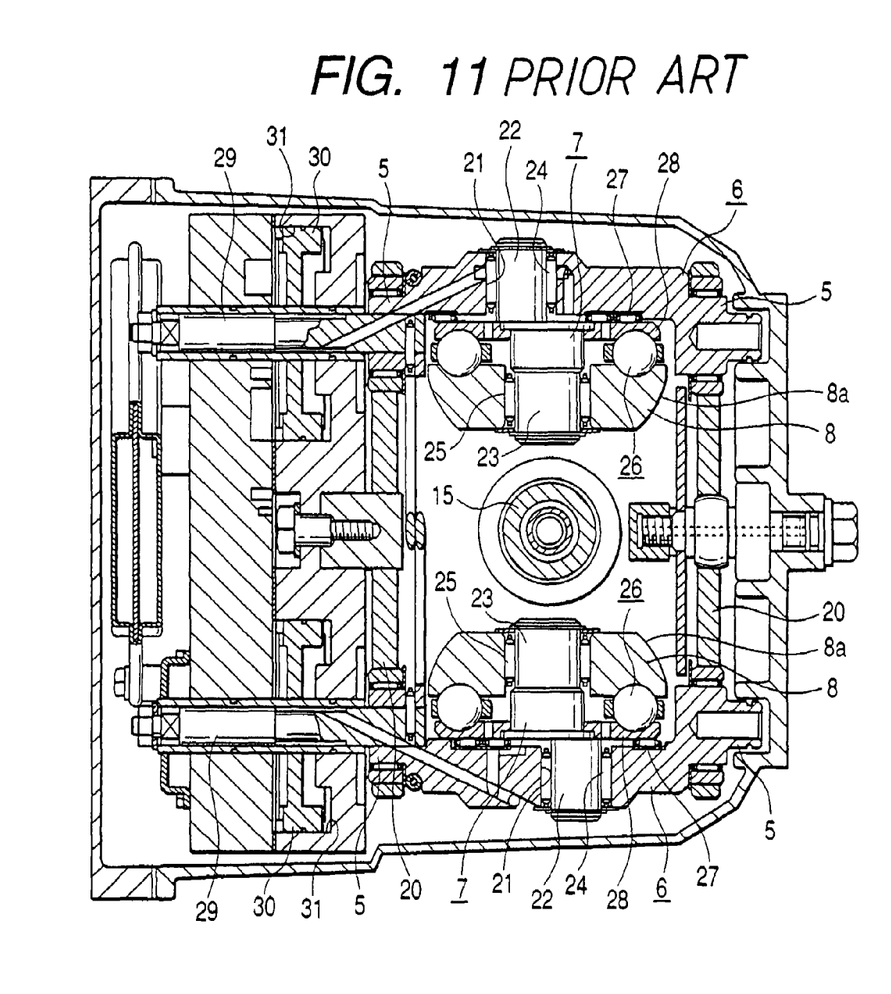
FIG. 11 is a sectional view taken along the line XI—XI in FIG. 10.

FIGS. 10 and 11 show an example of a more concrete toroidal type continuously variable transmission described in Japanese Utility Model Application Laid-Open No. 1-173552. An input side disc 2 and an output side disc 4 are rotatably supported around a cylindrical input shaft 15 via needle bearings 16. Further, a cam plate 10 is spline-connected to an outer peripheral surface of the input shaft 15 at an end thereof (left end in FIG. 10), and the cam plate is prevented from being shifted away from the input side disc 2 by means of a flange 17. The cam plate 10 and rollers 12 constitute an urging device 9 for rotating the input side disc 2 while urging it toward the output side disc 4 as the input shaft 15 is rotated. An output gear 18 is joined to the output side disc via keys 19 so that the output side disc 4 and the output gear 18 are rotated in a synchronous manner.

Pivot shafts 5 provided on both ends of a pair of trunnions 6 are supported by a pair of support plates 20 for rocking movement and axial displacement (in a direction perpendicular to the plane of FIG. 10 and a left-and-right direction in FIG. 11). Displacement shafts 7 are supported in circular holes 21 formed in intermediate portions of the trunnions 6. The displacement shafts 7 have parallel and eccentric support shaft portions 22, and pivot shaft portions 23. The support shaft portions 22 are rotatably supported in the circular holes 21 via radial needle bearings 24. Further, power rollers 8 are rotatably supported around the pivot shaft portions 23 via radial needle bearings 25.

Incidentally, the pair of displacement shafts 7 are disposed at positions diametrically opposed with respect to the input shaft 15. Further, directions along which the pivot shaft portions 23 of the displacement shafts 7 are eccentric with respect to the support shaft portions 22 are the same directions (opposite directions in FIG. 11) with respect to the rotational directions of the input and output side discs 2, 4. Further, the eccentric directions are substantially perpendicular to the installation direction of the input shaft 15. Accordingly, the power rollers 8 are supported for slight displacement in the axial direction (left-and-right direction in FIG. 10 and direction perpendicular to the plane of FIG. 11) of the input shaft 15. As a result, even if the power rollers 8 tend to be displaced in the axial direction of the input shaft 15 due to elastic deformation of the constructional parts caused by a great load acting on the constructional parts during the rotational force transmitting condition, such displacement can be absorbed without applying great or excessive force to the various parts.

Further, thrust ball bearings 26 and thrust needle bearings 27 are disposed between the outer surfaces of the power rollers 8 and the inner surfaces of the intermediate portions of the trunnions 6, and the thrust ball bearings 26 are located near the power rollers 8. The thrust ball bearings 26 serve to permit rotation of the power rollers 8 while supporting a thrust load acting on the power rollers 8. On the other hand, the thrust needle bearings 27 permit the pivot shaft portions 23 and outer races 28 of the thrust ball bearings 26 to be rocked around the support shaft portions 22 while supporting a thrust load acting on the outer races 28 from the power rollers 8.

Further, ends (left ends in FIG. 11) of the trunnions 6 are connected to drive rods 29, and drive pistons 30 are secured to outer peripheral surfaces of intermediate portions of the drive rods 29. The drive pistons 30 are mounted within drive cylinders 31 in an oil-tight manner.

In case of the toroidal type continuously variable transmission having the above-mentioned construction, the rotation of the input shaft 15 is transmitted to the input side disc 2 through the urging device 9. The rotation of the input side disc 2 is transmitted to the output side disc 4 through the pair of power rollers 8, and the rotation of the output side disc 4 is taken out by the output gear 18. When the rotational speed ratio between the input shaft 15 and the output gear 18 is changed, the pair of drive pistons 30 are displaced in opposite directions. In accordance with the displacement of the drive pistons 30, the pair of trunnions 6 are displaced in opposite directions, with the result that, for example, the lower (in FIG. 11) power roller 8 is displaced to the right in FIG. 11 and the upper power roller is displaced to the left in FIG. 11. As a result, directions of tangential forces acting on contact areas between peripheral surfaces 8a of the power rollers 8 and inner surfaces 2a, 4a of the input and output side discs 2, 4 are changed. As the directions of the forces are changed, the trunnions 6 are rocked around the pivot shafts 5 pivotally mounted on the support plates 20 in opposite directions. As a result, similar to the example shown in FIGS. 8 and 9, the contact areas between peripheral surfaces 8a of the power rollers 8 and inner surfaces 2a, 4a are changed, thereby changing the rotational speed ratio between the input shaft 15 and the output gear 18.

Incidentally, when the transmission of rotation is effected between the input shaft 15 and the output gear 18 in this way, due to the elastic deformation of the constructional parts, the power rollers 8 are displaced in the axial direction of the input shaft 15, and the displacement shafts 7 supporting the power rollers 8 are slightly rotated around the support shaft portions 22. As a result of such rotation, outer surfaces of the outer races 28 of the thrust ball bearings 26 and inner surfaces of the trunnions 6 are displaced relative to each other. Since there are the thrust needle bearings 27 between the outer surfaces and the inner surfaces, a force required for such relative displacement is small. Accordingly, the force for changing the inclination angles of the displacement shafts 7 in the above-mentioned manner becomes small.

Further, although not shown in FIGS. 10 and 11, lubricating oil (traction oil) is continuously supplied to contact areas (traction portions) between the peripheral surfaces 8a of the power rollers 8 and the inner surfaces 2a, 4a of the input and output side discs 2, 4 to form oil films on the contact areas. That is to say, in each contact area, for example, a contact elliptical zone having a dimension of about 4×10 mm is formed. For example, a great power exceeding 50 kw is transmitted, high surface pressure (or bearing) equal to or greater than 3.5 GPa act on central portions of such contact elliptical zones. Since heat generating amounts also becomes great in the traction portions to which such high surface pressure is applied, the traction oil must be supplied to the traction portions in order to cool the traction portions and maintain the oil films on the traction portions.

To this end, for example, lubricating devices as disclosed in Japanese Patent Application Laid-Open No. 4-29659 and Japanese Utility Model Application Laid-Open No. 2-47458 have been proposed. The lubricating device disclosed in the Japanese Utility Model Application Laid-Open No. 2-47458 serves to supply the traction oil to the traction portions through nozzle holes provided in the power rollers. On the other hand, in the lubricating device disclosed in the Japanese Patent Application Laid-Open No. 4-29659, in addition to the nozzle holes provided in the power rollers, nozzle holes for supplying the traction oil are also formed in a housing.

Figure 12:
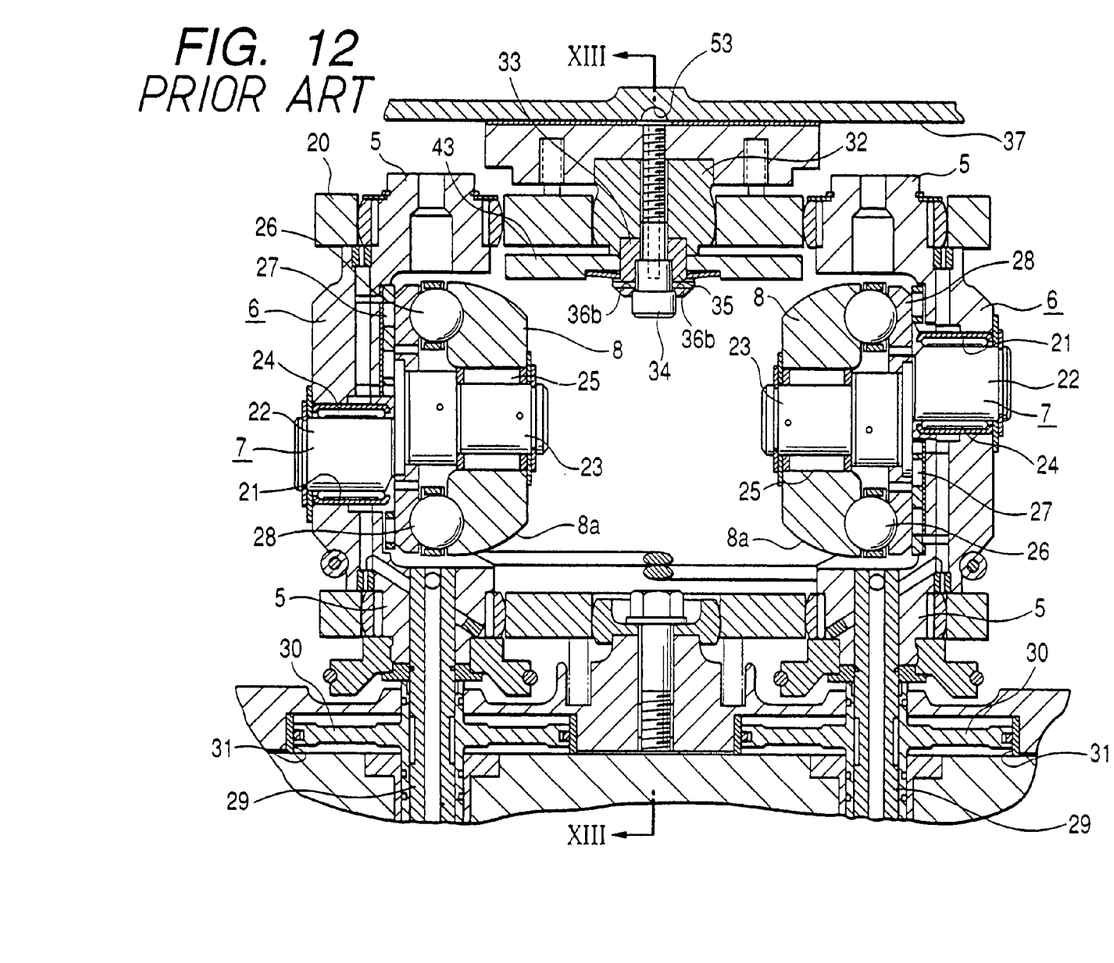
FIG. 12 is a sectional view similar to FIG. 11, showing a second example of a concrete construction of a toroidal type continuously variable transmission.
Figure 13:
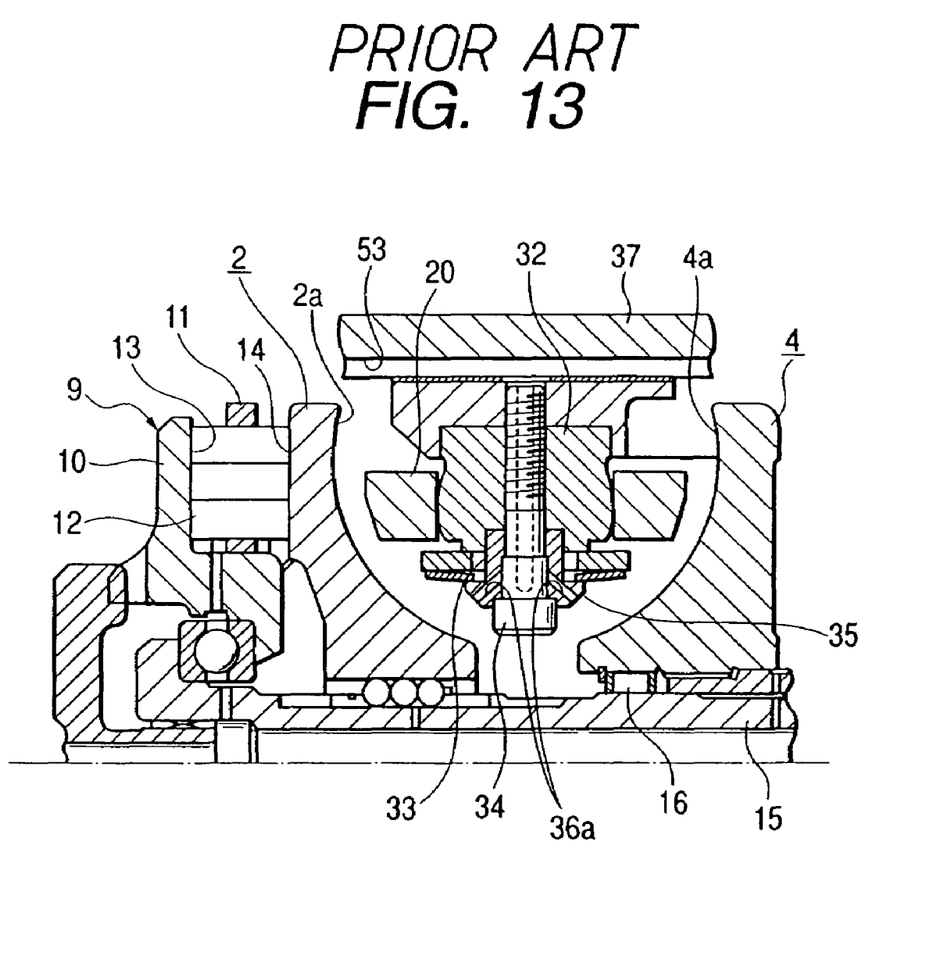
FIG. 13 is a sectional view taken along the line XIII—XIII in FIG. 12, with parts being omitted from illustration.

Further, Japanese Patent Application Laid-Open No. 11-210855 discloses a lubricating device as shown in FIGS. 12 and 13. In this conventional lubricating device, a lubricating post 33 is fixedly connected to, by a connecting screw 34, to a distal end of a support post 32 for supporting an intermediate portion of a support plate 20 for rocking movement and displacement movement in an axial direction (up-and-down direction in FIGS. 12 and 13) of pivot shafts 5. Among four nozzle holes, having downstream ends opened at four equidistant locations on the circumference of a hold-down flange 35, formed on a distal end of the lubricating post 34, downstream ends of two nozzle holes 36a shown in FIG. 13 are opened toward an inner surface 2a of an input side disc 2 and an inner surface 4a of an output side disc 4, respectively. On the other hand, downstream ends of two nozzle holes 36b shown in FIG. 12 are opened toward peripheral surfaces 8a of power rollers 8.

In operation of the toroidal type continuous variable transmission, traction oil is supplied to the above-mentioned four nozzle holes 36a, 36b through a lubricating oil supply groove 53 formed in an inner surface of a housing 37 by the action of an oil sending pump (not shown). The traction oil is injected from the downstream ends of four nozzle holes 36a, 36b. Among the traction oil injected from the nozzle holes 36a, 36b, the traction oil injected from two nozzle holes 36a shown in FIG. 13 is firstly adhered to the inner surfaces 2a, 4a of the input and output side discs 2, 4 and then is sent to the traction portions as contact areas between the inner surfaces 2a, 4a and the peripheral surfaces 8a of the power rollers 8. On the other hand, the traction oil injected from two nozzle holes 36b shown in FIG. 13 is firstly adhered to the peripheral surfaces 8a and then is sent to the traction portions.

In case of the toroidal type continuously variable transmission, adequate lubricating oil supplying must be performed for the following reason. That is to say, in the contact elliptical zones existing in the traction portions as the contact areas between the inner surfaces 2a, 4a of the input and output side discs 2, 4 and the peripheral surfaces 8a of the power rollers 8, spin as rotational slip component is generated during the operation of the toroidal type continuously variable transmission. Since the occurrence of such spin is inevitable and the spin is rotational slip component directing in perpendicular to the driving direction, the spin leads in power loss as it is. Such power loss is in the form of heat which increases temperatures of the input and output side discs 2, 4, power rollers 8 and traction oil existing in the traction portions. If the temperatures of the members 2, 4, 8 and the traction oil are increased, traction coefficient is reduced due to reduction in viscosity of the traction oil to generate slip, with the result that not only transmitting efficiency of the toroidal type continuously variable transmission is decreased but also damage of transmission such as seizure may occur if the temperatures are increased considerably.

In this way, in case of the toroidal type continuously variable transmission in which the traction oil existing on the traction portions transmits the power, it is important to suppress the increase in temperature at the traction portions in consideration of the heat generating amounts at the traction portions. However, the heat generating amounts at the traction portions are varied in dependence with not only the magnitude of power (load) passing through the toroidal type continuously variable transmission but also the transmission ratio and the number of revolutions. That is to say, since the magnitude of the above-mentioned spin is varied in dependence upon the transmission ratio and the number of revolutions, the heat generating amounts are also varied accordingly. Therefore, in order to prevent the reduction in transmitting efficiency and the damage due to the above-mentioned reason, it is preferable that the traction oil supplying condition is changed in accordance with the running condition of the toroidal type continuously variable transmission.

However, in case of the conventional toroidal type continuously variable transmissions including that shown in FIGS. 12 and 13, it is designed so that, during the running of the toroidal type continuously variable transmission, the traction oil is applied to given portions by predetermined amounts regardless of the running condition. On the other hand, the amount of the traction oil required for lubricating the traction portions as the contact areas between the inner surfaces 2a, 4a of the input and output side discs 2, 4 and the peripheral surfaces 8a of the power rollers 8 is varied with the running condition as mentioned above. More specifically, the greater the power to be transmitted from the input side disc 2 to the output side disc 4 the greater the required amount of the traction oil. Further, as apparent from FIGS. 8 and 9, the contact areas of the inner surfaces 2a, 4a of the input and output side discs 2, 4 contacted with the peripheral surfaces 8a of the power rollers 8a are changed in accordance with the transmission ratio between the discs 2 and 4.

In this regard, in the conventional designs, excessive traction oil was injected so that adequate traction oil can be supplied to the contact areas even when the power to be transmitted from the input side disc 2 to the output side disc 4 is great and even if the traction oil to be supplied to the inner surfaces 2a, 4a of the input and output side discs 2, 4 are deviated from the portions corresponding to the above-mentioned contact areas. In other words, the excessive traction oil was injected so that adequate traction oil can be supplied to the traction portions even under the most severe condition. Thus, not only power loss of the pump for supplying the traction oil under pressure becomes great, but also power loss due to agitating resistance of the excessive traction oil injected from the nozzles becomes great. As a result, the transmitting efficiency of the toroidal type continuously variable transmission is worsened. This is not preferable.

A toroidal type continuously variable transmission according to the present invention is devised in consideration of the above-mentioned circumstances.

SUMMARY OF THE INVENTION

Similar to the above-mentioned conventional toroidal type continuously variable transmissions, a toroidal type continuously variable transmission according to the present invention comprises a housing, input and output side discs coaxially disposed with each other and rotatably relative to each other within the housing, a plurality of trunnions rocked around respective pairs of coaxial pivot shafts located at positions twisted with respect to center lines of the input and the output side discs, displacement shaft supported for respective trunnions, and a plurality of power rollers rotatably supported on the displacement shafts and pinched between inner surfaces of the input and output side discs. The opposed inner surfaces of the input and output side discs have, at section, arc concave surfaces, and peripheral surfaces of the power rollers have spherical convex surfaces which are contacted with the inner surfaces. Further, traction oil can be supplied to contact areas between the inner surfaces of the discs and the peripheral surfaces of the power rollers.

Particularly, in the toroidal type continuously variable transmission according to a first aspect of the present invention, a supplying amount of the traction oil is increased as a power to be transmitted from the input side disc to the output side is increased.

Further, in the toroidal type continuously variable transmission according to a second aspect of the present invention, nozzles for supplying the traction oil can be rocked as the trunnions are rocked around the pivot shafts so that the traction oil injected from the nozzles can be applied to circumferential positions same as portions of the inner surfaces of the discs contacted with the peripheral surfaces of the power rollers.

In the toroidal type continuously variable transmissions having the above-mentioned constructions, since the traction oil supplying condition is changed in accordance with the running condition, an adequate, amount of traction oil can be supplied to traction portions, with the result that reduction in transmitting efficiency due to supplying of excessive traction oil can be prevented while preventing reduction in transmitting efficiency due to slip and damage such as seizure. Further, by combining the inventions according to the first and second aspects, more excellent function and effect can be achieved.

The other objects and feature of the present invention will be apparent from the following detailed explanation referring to the accompanying drawings.

DESCRIPTION OF THE PREFERRED EMBODIMENTS

Figure 1:
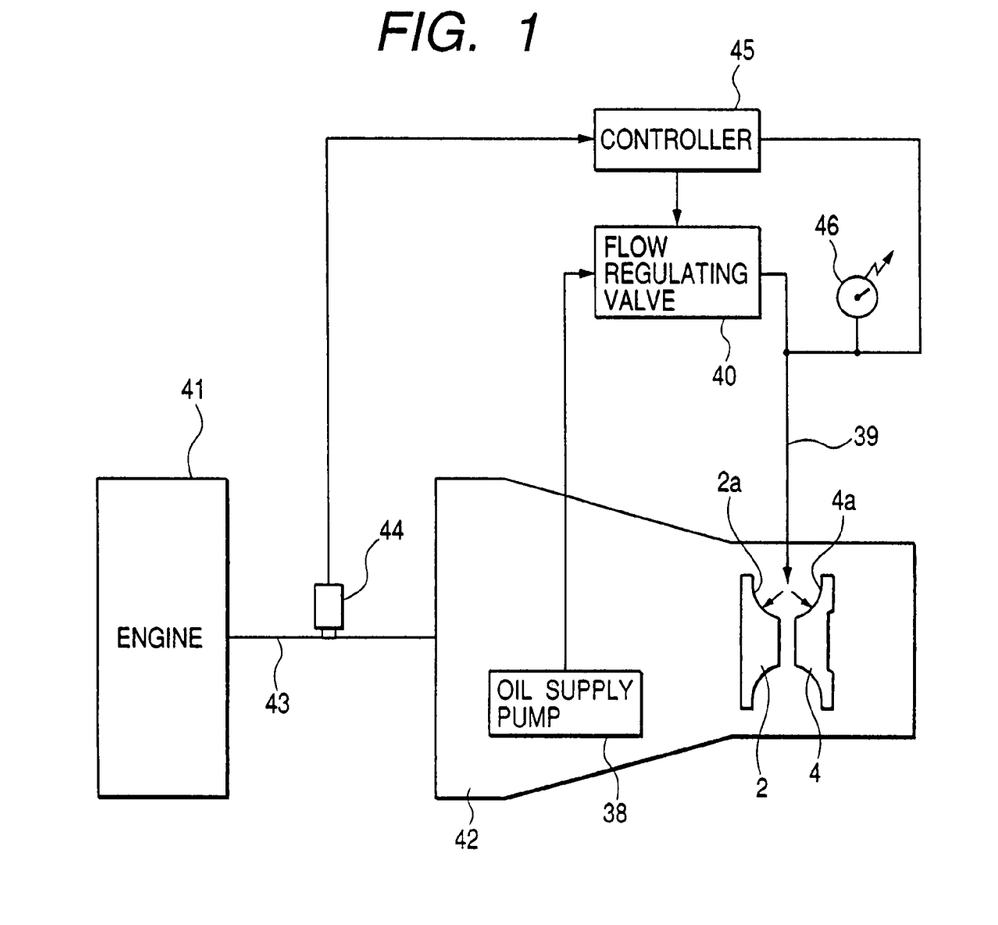
FIG. 1 is a schematic view showing a first embodiment of the present invention.

FIG. 1 shows a first embodiment of the present invention corresponding to a first aspect of the present invention. Incidentally, the present invention is characterized in that traction oil is efficiently supplied to traction portions as contact areas between inner surfaces 2a, 4a of input and output side discs 2, 4 and peripheral surfaces 8a (refer to FIGS. 8 to 12; not shown in FIG. 1) of power rollers 8. Since a construction of a toroidal type continuously variable transmission is the same as that of the above-mentioned conventional transmission, the same explanation and illustration will be omitted, and characteristic portions of the present invention will mainly be explained.

A flow regulating valve 40 is provided on the way of an oil supply passage 39 connecting between an oil supply pump 38 for feeding out traction oil and a lubricating post 33 (FIGS. 12 and 13) having nozzle holes 36a, 36b for injecting the traction oil. Further, a rotation sensor 44 for detecting a rotational speed of a transmission shaft 43 connecting between engine 41 and an input shaft 15 (refer to FIGS. 10 and 11) of a toroidal type continuously variable transmission 42 and torque acting on the transmission shaft 43 is provided on the way of the transmission shaft 43. A detection signal from the rotation sensor 44 is inputted to a controller 45 including a microcomputer and adapted to control an opening degree of the flow regulating valve 40. In the illustrated embodiment, in addition to the detection signal from the rotation sensor 44, a detection signal from an oil temperature sensor 46 for detecting a temperature of the traction oil sent to the lubricating post 33 is also inputted to the controller 45.

In the toroidal type continuously variable transmission having the above-mentioned construction, a supplying condition of the traction oil is changed in accordance with a running condition of the transmission. That is to say, as the rotational speed of the transmission shaft 43 detected by the rotation sensor 44 is increased and as the torque acting on the transmission shaft 43 is increased, the opening degree of the flow regulating valve 40 is increased, thereby increasing the amount of the traction oil injected from the nozzle holes 36a, 36b of the lubricating post 33. Thus, the adequate amount of traction oil can be supplied to the traction portions, with the result that reduction in transmitting efficiency due to supplying of excessive traction oil can be prevented while preventing reduction in transmitting efficiency due to slip and damage such as seizure. Further, the controller 45 serves to increase the opening degree of the flow regulating valve 40 as the temperature of the traction oil detected by the oil temperature sensor 46 is increased, thereby increasing the amount of the traction oil injected from the nozzle holes 36a, 36b of the lubricating post 33. Thus, even if the temperature of the traction oil is high, the traction portions can be cooled sufficiently to prevent the seizure.

Incidentally, in the above explanation, while an example that the rotational speed and the number of revolutions of the transmission shaft 43 are detected in order to detect the power to be transmitted from the input side disc 2 to the output side disc 4 was explained, to carry out the present invention, the following methods can be used in order to detect the power:

(i) Detect the number of revolutions of any part and an opening degree of an acceleration pedal; or (ii) Detect the number of revolutions of any part and difference in pressure between chambers (refer to FIG. 12) on both sides of pistons 30 within drive cylinders 30 for displacing the trunnions 6.

In case of (i), on the basis of the number of revolutions and the opening degree, the torque generated from the engine 41 is sought, and, on the basis of the sought number of revolutions and opening degree in this way, the opening degree of the flow regulating valve 40 is adjusted. On the other hand, in case of (ii), on the basis of the difference in pressure, the torque transmitted by the toroidal type continuously variable transmission 42 is sought, and, on the basis of the torque and the number of revolutions sought in this way, the opening degree of the flow regulating valve 40 is adjusted.

Figure 2:
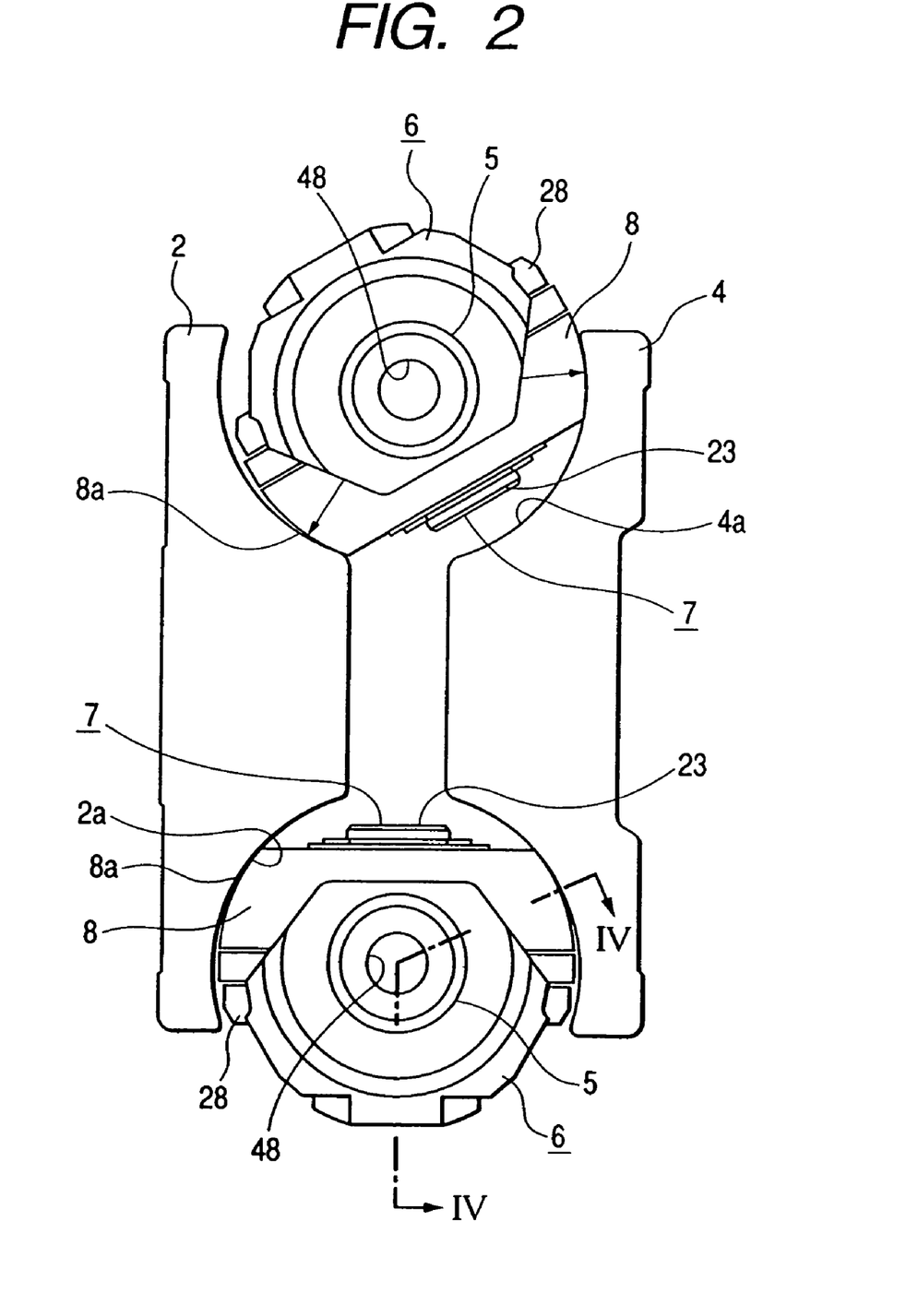
FIG. 2 is a partial side view showing a second embodiment of the present invention, illustrating a condition that a transmission ratio in an upper half is different from that in a lower half.
Figure 3:
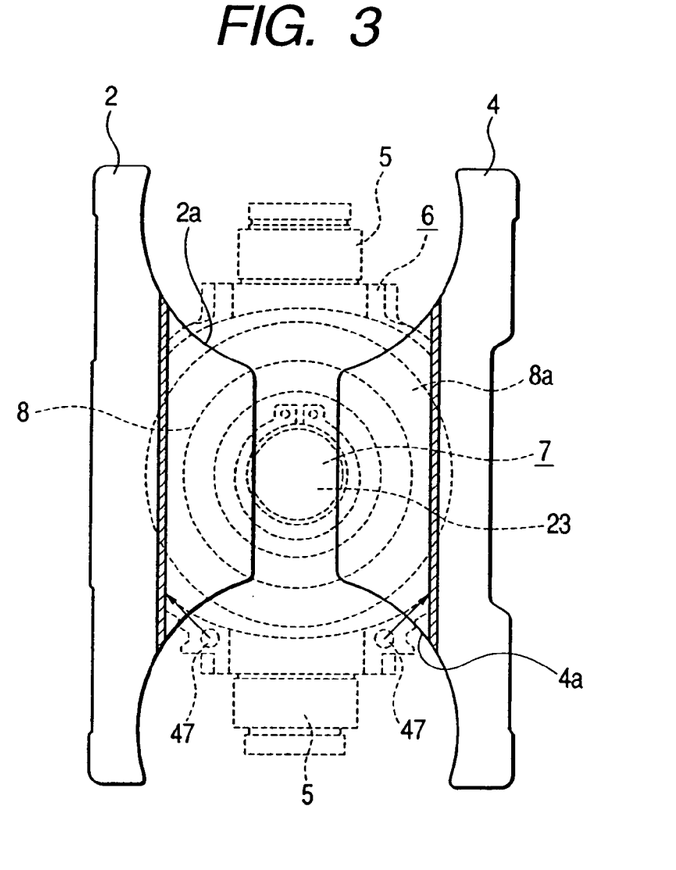
FIG. 3 is a view looked at from the above in FIG. 2, with trunnions being omitted from illustration.
Figure 4:
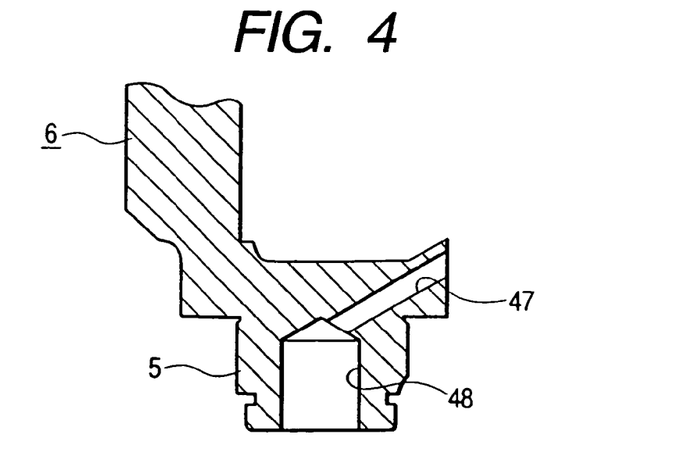
FIG. 4 is a sectional view taken along the line IV—IV in FIG. 2.

Next, FIGS. 2 to 4 show a second embodiment of the present invention corresponding to a second aspect of the present invention. In this embodiment, two nozzle holes 47 for injecting traction oil are formed in protruded portions protruded from an outer periphery of a power roller 8 at one longitudinal end of a trunnion 6 in a width-wise direction. The nozzle holes 47 are opened toward circumferential positions same as portions of inner surfaces 2a, 4a of input and output side discs 2, 4 contacted with a peripheral surface of a power roller. That is to say, in the power transmission from the input side disc 2 to the output side disc 4, the inner surfaces 2a, 4a are rollingly contacted with the peripheral surface 8a of the power roller 8 at band-shaped zones shown by cross-hatching in FIG. 3. In the illustrated embodiment, the nozzle holes 47 are opened toward the cross-hatched zones. The traction oil can be sent into the nozzle holes 47 through a bore 48 opened to an end face of a pivot shaft 5 provided on one end (lower end in FIGS. 3 and 4) of the trunnion 6. Incidentally, an end of a cylindrical hollow drive rod 29 (refer to FIG. 12) is fixedly fitted into the bore 48 so that the traction oil can be supplied to the bore through the drive rod 29.

In the operation of the toroidal type continuously variable transmission having the above-mentioned construction according to the illustrated embodiment, the traction oil injected from the nozzle holes 47 is sprayed onto the band-shaped zones (shown by the cross-hatching in FIG. 3) of the inner surfaces 2a, 4a of the input and output side discs 2, 4 contacted with the peripheral surface 8a of the power roller 8. The portions of the inner surfaces 2a, 4a contacted with the peripheral surface 8a are changed as the inclination angle of the trunnion 6 is changed to a condition shown in an upper half or a lower half of FIG. 2 to change the transmission ratio between the input side disc 2 and the output side disc 4. In the illustrated embodiment, even if the contacted portions are changed as mentioned above, the nozzle holes 47 continue to be directed toward portions (the band-shaped zones around the center of the power roller 8) corresponding to such portions. Thus, even when the excessive traction oil is not injected from the nozzle holes 47, an adequate amount of traction oil can be supplied to the traction portions, thereby preventing reduction in transmitting efficiency due to the slip and damage such as seizure. Accordingly, reduction in transmitting efficiency due to the supplying of excessive traction oil can be prevented while preventing the damage. Incidentally, while a stopper mechanism for preventing excessive inclination angle of the trunnion 6 is provided between the trunnion 6 and a fixed portion adjacent to the trunnion 6, the nozzle holes 47 are provided at the end opposite to the stopper mechanism with respect to the longitudinal direction of the trunnion 6.

Figure 5:
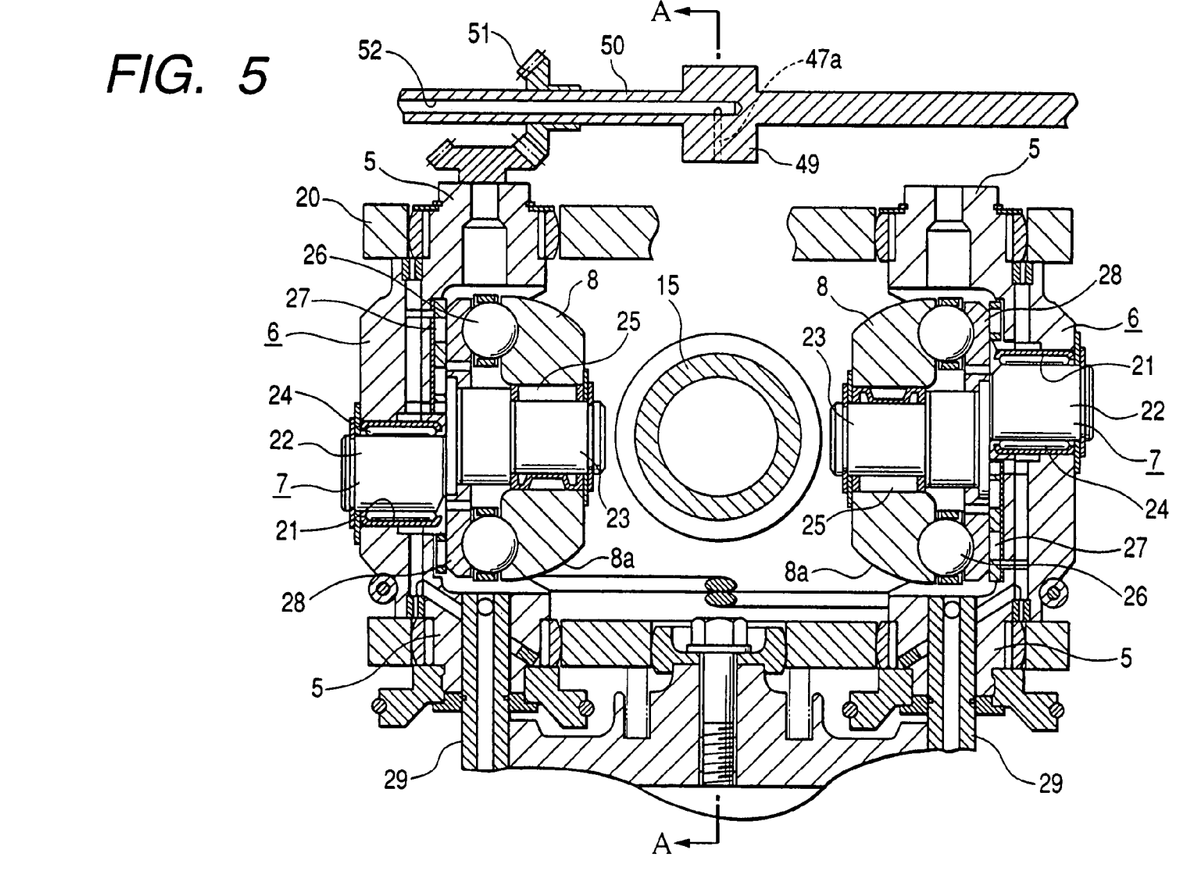
FIG. 5 is a partially sectional view showing a third embodiment of the present invention.
Figure 6:
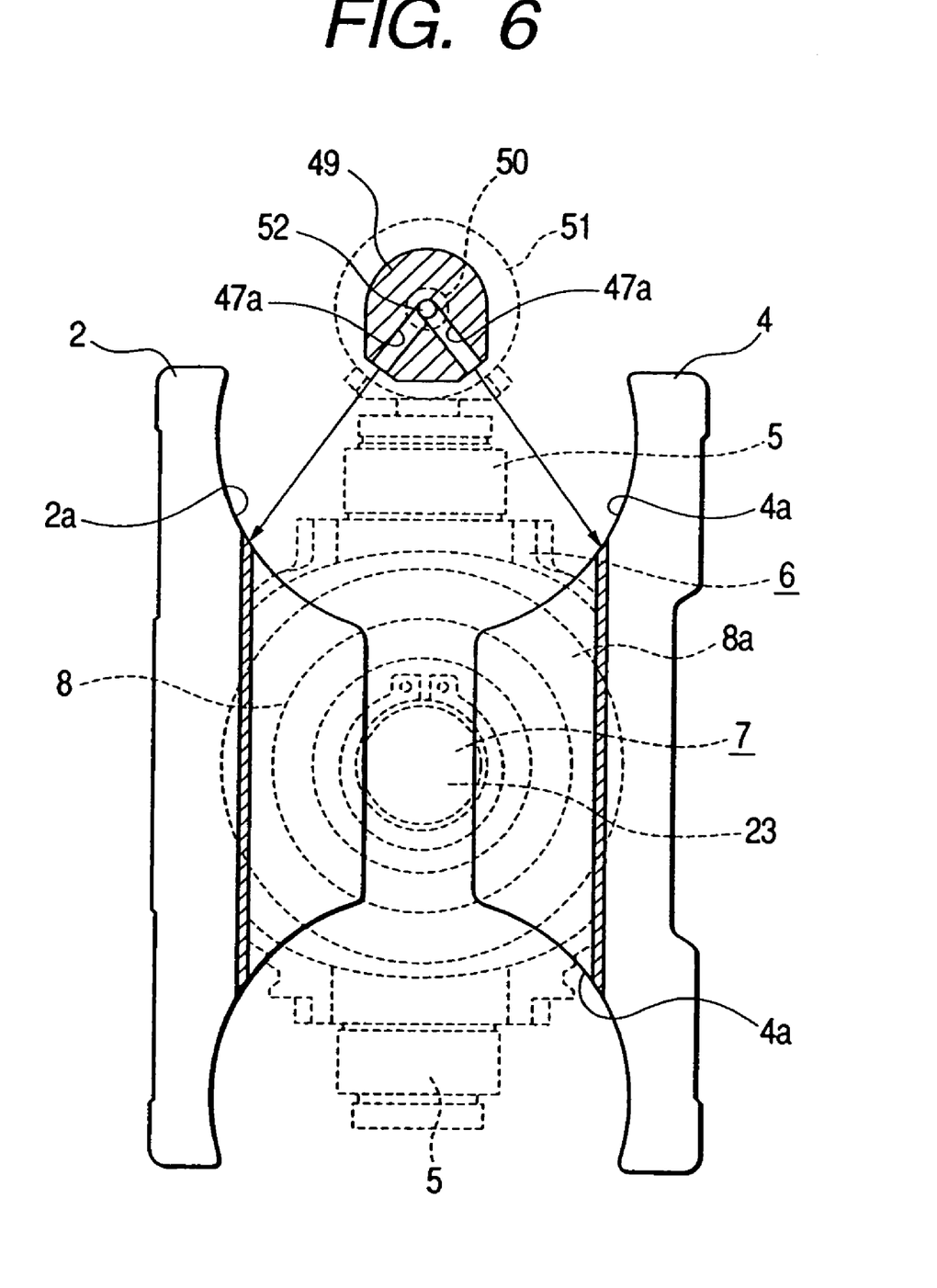
FIG. 6 is a sectional view taken along the line A—A in FIG. 5, in a condition that transmission ratio is 1.
Figure 7:
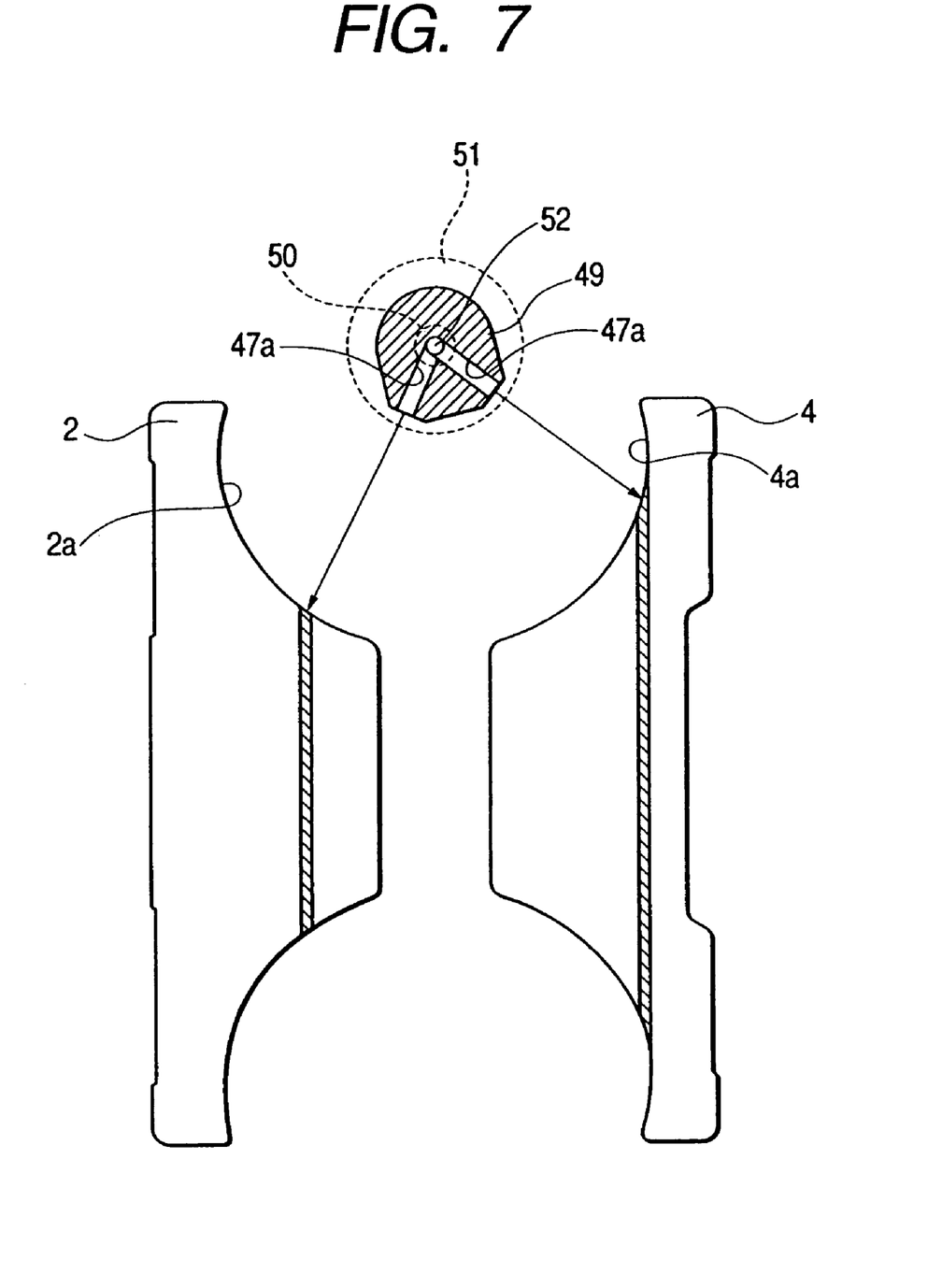
FIG. 7 is a sectional view taken along the line A—A in FIG. 5, in a condition that transmission ratio is other than 1.

Successively, FIGS. 5 to 7 show a third embodiment of the present invention. In this embodiment, a lubricating post 49 for supplying the traction oil to the traction portions is provided independently of the trunnions 6 so that the direction of the lubricating post 49 can be changed in accordance with the variation of the inclination angle of the trunnions 6. On this account, in this embodiment, a rotation transmission mechanism 51 including bevel gears is provided between the end of one (left side in FIG. 5) of the trunnions 6 and the rod 50 supporting the lubricating post 49. Further, in the inside of the rod 50, an oil supply passage 52 for supplying the traction oil into the lubricating post 49 is provided.

In the operation of the toroidal type continuously variable transmission having the above-mentioned construction according to the illustrated embodiment, the traction oil injected from the nozzle holes 47a is sprayed onto the band-shaped zones (shown by the cross-hatching in FIGS. 6 and 7) of the inner surfaces 2a, 4a of the input and output side discs 2, 4 contacted with the peripheral surface 8a of the power roller 8. In the case that the band-shaped zones is changed as the inclination angle of the trunnions 6 is changed to change the transmission ratio between the input side disc 2 and the output side disc 4, the lubricating post 49 can be rocked and changed together with the trunnions 6 so that the nozzle holes 47a continue to be directed toward the cross-hatching portions. Thus, even when the excessive traction oil is not injected from the nozzle holes 47a, an adequate amount of traction oil can be supplied to the traction portions, thereby preventing reduction in transmitting efficiency due to the slip and damage such as seizure.

Since the present invention is constructed and functioned as mentioned above, there can be realized a toroidal type continuously variable transmission in which excellent transmitting efficiency can be achieved while maintaining adequate endurance and reliability without supplying excessive traction oil. Incidentally, by combining the inventions according to the first and second aspects, efficiency of the toroidal type continuously variable transmission can be further enhanced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A toroidal continuously variable transmission comprising:
   a housing,
   input and output side discs coaxially disposed with each other and rotatably relative to each other within said housing,
   a plurality of trunnions rockable around respective pairs of coaxial pivot shafts located at positions twisted with respect to center lines of said input and output side discs,
   displacement shafts supported by the respective trunnions, and
   a plurality of power rollers rotatably supported on said displacement shafts and pinched between inner surfaces of said input and output side discs,
   wherein inner surfaces of said input and output side discs have in section, arcuate concave surfaces, and peripheral surfaces of the power rollers have spherical convex surfaces which are in contact with said inner surfaces, and traction oil is supplied to contact areas between said inner surfaces of said discs and peripheral surfaces of said power rollers, and
   wherein nozzle holes are provided for supplying the traction oil, said nozzle holes being rocked as said trunnions are rocked around said pivot shafts so that the traction oil ejected from said nozzle holes is sprayed only onto said discs, at positions circumferentially spaced from positions at which said inner surfaces contact with said peripheral surfaces of said power rollers.

2. A toroidal continuously variable transmission comprising:
   a housing;
   input and output discs coaxially disposed with each other and rotatable relative to each other within the housing, and each having an inner surface;
   a plurality of pivotable trunions;
   a plurality of nozzle holes arranged for pivotal movement with pivotal movement of the trunnions; and
   a plurality of power rollers rotatably supported by the plurality of trunions and disposed between the input and output discs, wherein contact areas are formed between the inner surfaces of the input and output discs and peripheral surfaces of the power rollers, and
   wherein the nozzle holes are oriented to direct traction oil only to portions of the inner surfaces of the input and output discs circumferentially spaced from the contact areas.

* * * * *